(12) United States Patent
Poletto et al.

(10) Patent No.: US 7,706,273 B2
(45) Date of Patent: Apr. 27, 2010

(54) PORT TRACKING ON DYNAMICALLY NEGOTIATED PORTS

(75) Inventors: Massimiliano Antonio Poletto, Cambridge, MA (US); Andrew Gorelik, Waltham, MA (US)

(73) Assignee: Riverbed Technology, Inc., San Francisco, CA (US)

( * ) Notice: Subject to any disclaimer, the term of this patent is extended or adjusted under 35 U.S.C. 154(b) by 1320 days.

(21) Appl. No.: 10/955,450

(22) Filed: Sep. 30, 2004

(65) Prior Publication Data

US 2006/0067220 A1 Mar. 30, 2006

(51) Int. Cl.
*H04L 12/26* (2006.01)
(52) U.S. Cl. .................. 370/235; 370/401; 370/474; 709/224
(58) Field of Classification Search ................ 370/401, 370/235, 229, 230; 709/224–226
See application file for complete search history.

(56) References Cited

U.S. PATENT DOCUMENTS

| | | | | |
|---|---|---|---|---|
| 5,923,849 A | * | 7/1999 | Venkatraman | 709/224 |
| 7,280,547 B2 | * | 10/2007 | Featherston et al. | 370/401 |
| 7,283,542 B2 | * | 10/2007 | Mitchell | 370/401 |
| 7,283,545 B2 | * | 10/2007 | Picha | 370/401 |
| 7,296,288 B1 | * | 11/2007 | Hill et al. | 726/2 |
| 2002/0107953 A1 | * | 8/2002 | Ontiveros et al. | 709/224 |
| 2003/0105976 A1 | * | 6/2003 | Copeland, III | 713/201 |
| 2004/0088571 A1 | * | 5/2004 | Jerrim et al. | 713/201 |

* cited by examiner

*Primary Examiner*—Ricky Ngo
*Assistant Examiner*—Gary Mui
(74) *Attorney, Agent, or Firm*—Park, Vaughan & Fleming LLP

(57) ABSTRACT

Techniques for tracking dynamically negotiated port connections in a network include collecting statistical information on packets that are sent between nodes on a network, inspecting packets of control connections to detect payload fragments that denote ephemeral port negotiation and producing a mapping from a ephemeral connection flow_id to a control connection flow_id. The techniques also include checking the flow_id to see whether a flow record maps to a control connection.

32 Claims, 4 Drawing Sheets

PORT TRACKING ON DYNAMICALLY NEGOTIATED PORTS

BACKGROUND

This invention relates to techniques to detect network anomalies.

Networks allow computers to communicate with each other whether via a public network, e.g., the Internet or private networks. Managing networks is increasingly costly, while the business cost of network problems becomes increasingly high. Managing an enterprise network involves a number of inter-related activities including establishing a topology, establishing policies for the network and monitoring network performance. Another task for managing a network is detecting and dealing with security violations, such as denial of service attacks, worm propagation and so forth.

When collecting data on network traffic it is often necessary to determine the protocol/port used. Most traffic on the Internet uses well-known transport level port numbers. For example, the Hyper-Text Transfer Protocol (HTTP) usually uses port 80/Transmission Control Protocol (tcp); Domain Naming Service (DNS) protocol usually uses port 53/User datagram protocol (udp) and so forth. Some protocols, however, use short-lived (ephemeral), dynamically negotiated port numbers; each connection or transaction might use a different ephemeral port number.

SUMMARY

For short-lived (ephemeral) protocols, each connection dynamically negotiates port numbers, so that each connection or transaction might use a different ephemeral port number. Because of the changing port numbers, it is difficult to determine, whether different transfers are related or use the same underlying protocol.

According to an aspect of the invention, a system includes a plurality of collector devices that are disposed to collect information based on packets sent between nodes in a network. The collector devices include a process to inspect packets of control connections to detect payload fragments that denote an ephemeral port negotiation and produce a mapping from an ephemeral connection flow_id to a control connection flow id. The system also includes an aggregator that receives the mapping data from the plurality of collector devices, and checks the flow_id to see whether a received flow record maps to a control connection.

The following embodiments are within the scope of the claims. If the flow id maps to a control connection, then the aggregator indicates that the flow record corresponds to an ephemeral flow for a known control connection. The aggregator associates ephemeral flow statistics with those of the well-known protocol that corresponds to the control connection. The aggregator expires the ephemeral flow id mappings after a configurable timeout. The aggregator performs an application-specific analysis without the need to transfer actual packet payloads from the collector to the aggregator. The collectors examine all packets on a specific port for a specific connection protocol. The protocol tracked can be the ftp and the connection port examined can be port 21/tcp. The payload fragments denote ephemeral port negotiation for FTP are 'PORT' and '227' FTP commands. The collector sends the new mapping in a message to the aggregator.

According to an additional aspect of the invention, a collector device is disposed to collect statistical information on packets sent between nodes on a network. The collector device includes a processor and a memory executing instructions to cause the collector device to inspect packets of control connections to detect payload fragments that denote ephemeral port negotiation, produce a mapping from an ephemeral connection flow_id to a control connection flow id, and send the mapping to an aggregator device.

The following embodiments are within the scope of the claims. The collector examines all packets on a specific port for a specific connection protocol. The protocol tracked is the ftp and the connection port examined is port 21/tcp. The payload fragments that denote ephemeral port negotiation for FTP are 'PORT' and '227' FTP commands. The collector sends the new mapping in a message to the aggregator.

According to an additional aspect of the invention, a device includes a processor and a memory executing instructions. The instructions cause the device to receive mappings corresponding to an ephemeral connection flow_id to a control connection flow_id from a plurality of collector devices. The instructions check the flow_id to see whether a received flow record maps to a control connection.

The following embodiments are within the scope of the claims. If the flow_id maps the control connection, the instructions produce an indication that the flow record corresponds to an ephemeral flow for a known control connection. The device associates ephemeral flow statistics with those of the well-known protocol that corresponds to the control connection. The instructions expire the ephemeral flow_id mappings after a configurable timeout period.

According to an additional aspect of the invention, a computer program product for tracking dynamically negotiated port numbers includes instructions for causing a computer to collect statistical information on packets that are sent between nodes on a network. The program also includes instructions to inspect packets of control connections to detect payload fragments that denote ephemeral port negotiation, produce a mapping from an ephemeral connection flow_id to a control connection flow_id, and check the flow_id to see whether a flow record maps to a control connection.

According to an additional aspect of the invention, a computer program product residing on a computer readable medium for determining mappings for ephemeral port connections includes instructions to cause a computing device to inspect packets of control connections to detect payload fragments that denote ephemeral port negotiation. The program also includes instructions to produce a mapping from an ephemeral connection flow_id to a control connection flow id, and send the mapping to a device to associate the mapping with ephemeral connections.

According to an additional aspect of the invention, a computer program product resides on a computer readable medium. The program determines ephemeral port connections and includes instructions to cause a computing device to receive, from a plurality of collector devices, mappings corresponding to a ephemeral connection flow_id to a control connection flow_id. The instructions check the flow_id to see whether a received flow record maps to a control connection.

According to an additional aspect of the invention, a method for tracking dynamically negotiated port connections includes collecting statistical information on packets that are sent between nodes on a network. The method also includes inspecting packets of control connections to detect payload fragments that denote ephemeral port negotiation, producing a mapping from a ephemeral connection flow_id to a control connection flow_id and checking the flow_id to see whether a flow record maps to a control connection.

One or more aspects of the invention may provide one or more of the following advantages.

Ephemeral ports can be efficiently determined and tracked. In particular, the collectors only need to examine relevant control connections, not all traffic in order to track ephemeral ports. Additionally, the aggregator can perform a type of application-specific analysis without the need to transfer actual packet payloads from the collector to the aggregator. Rather, the collectors merely send an ephemeral flow id mapping, which the aggregator can use to track the ephemeral ports. This saves on network traffic, as well as processing capacity.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
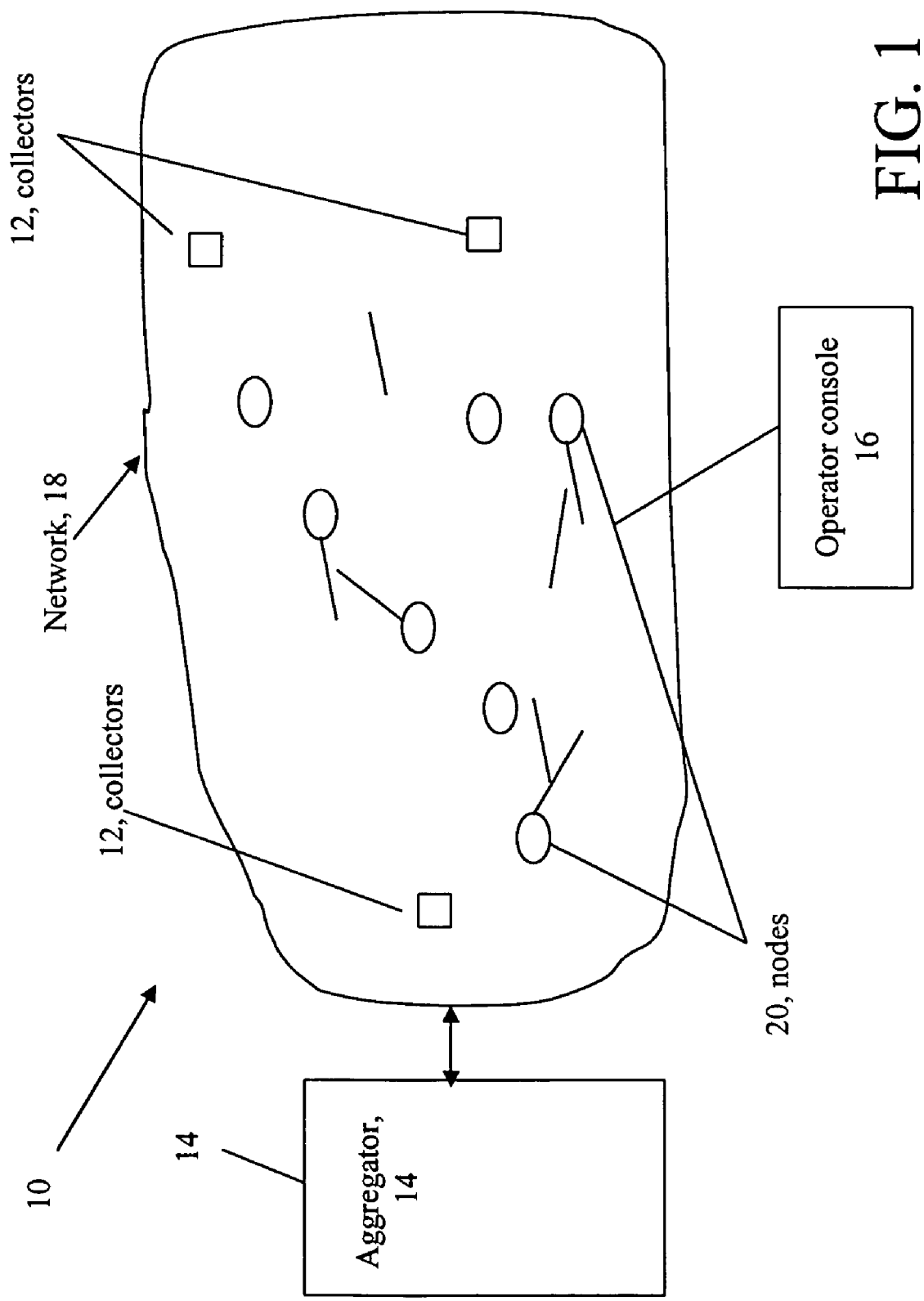
FIG. 1 is a block diagram of a network including anomaly detection.

Referring to FIG. 1, an anomaly detection system 10 to detect anomalies and process anomalies into events is shown. The anomaly detection system 10 can be used to detect denial of service attacks (DoS attacks), unauthorized access attempts, scanning attacks, worm propagation, network failures, and addition of new hosts in a network 18. The anomaly detection system 10 includes flow collector devices 12, at least one aggregator device 14 and an operator console 16 that communicates with and can control collector devices 12 and the at least one aggregator device 14. The flow collector devices 12 and the at least one aggregator 14 are disposed in the network 18. The flow collector devices 12 connect to network devices, 15 e.g., switches, hosts, routers, etc. in line, or via a tap, e.g., using mirror, SPAN ports or other passive link taps. In some embodiments, the flow collector devices 12 collect information such as source and destination addresses, transport protocol, source and destination ports, flags, and length and periodically sends that data to the aggregator. The flow collectors 12 send the information to the aggregator 14 allowing the aggregator 14 to store a record of the number of packets, bytes, and connections between every host pair observed by the flow collector 12, broken down by port and protocol. In addition, the flow collector devices 12 send summary information concerning flags seen on TCP packets. The flow collector devices 12 also collect connection information to identify host connection pairs.

Figure 2:
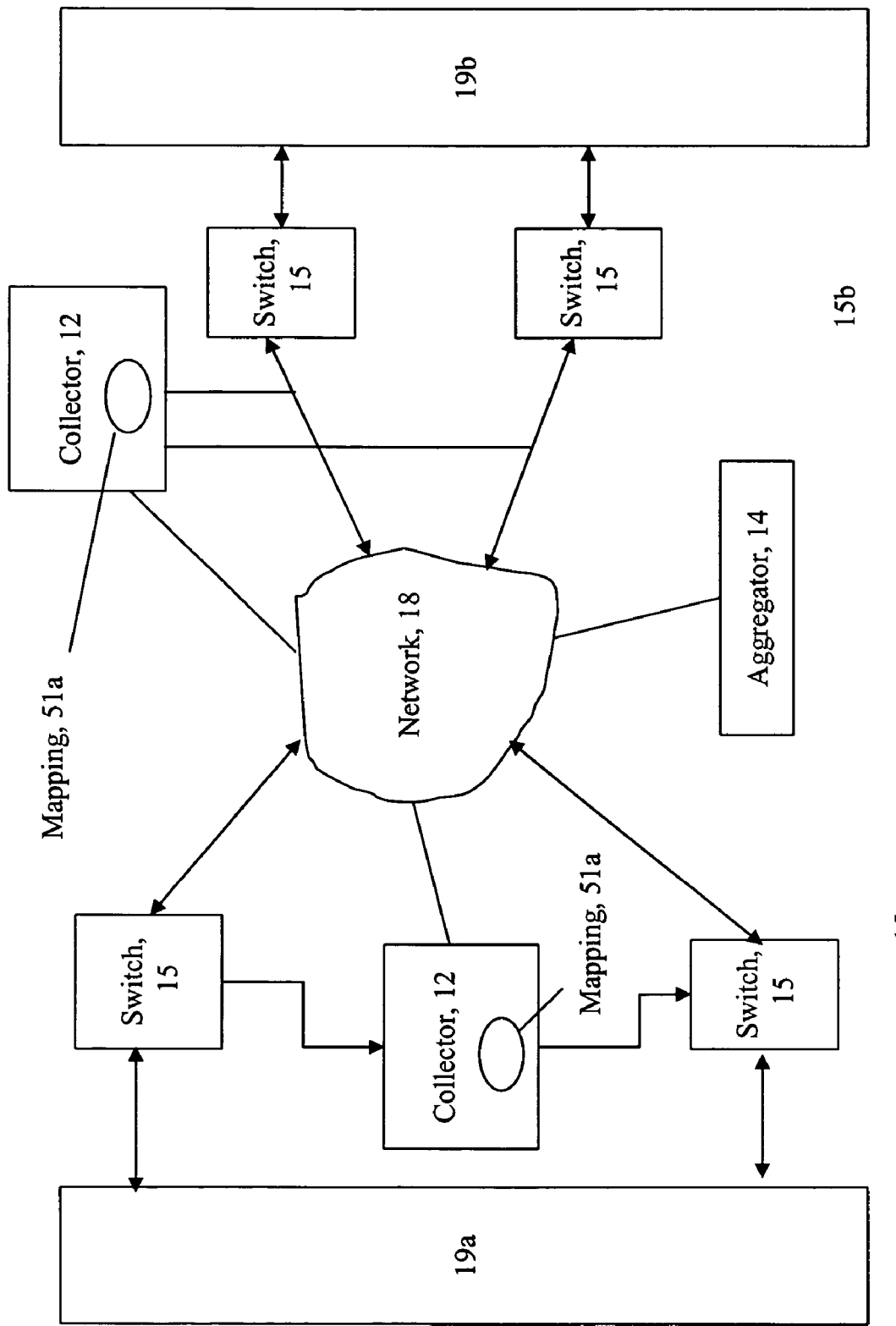
FIG. 2 is a block diagram depicting exemplary details of anomaly detection.

Referring to FIG. 2, flow collector devices 12 are disposed to sample or collect information from network devices 15, e.g., switches, as shown. The flow collector devices 12 or probes 12a, i.e., generally collector devices 12, send flow data information to the aggregator 14 over the network 18. The collectors 12 in one configuration sample all traffic from a downstream network 19a provided that the traffic traverses the switches 15, whereas in another configuration the collectors 12 sample traffic from downstream network 19b that enters and leaves the switches 15.

The architecture is based on establishing flow records from flows received from the collectors 12 and a connection table based on the flows. The flow records are actual flows whereas the connection table stores statistical data of bytes/second, packets/second, connections/hour statistics, and so forth over various periods of time, as discussed below allowing comparisons to historical data. The data collectors are devices that are coupled actively or passively on a link, and collect the above-mentioned flows. Data collectors 12 are connected via a tap, or can scan a port on a monitored device (e.g., router, etc.) over intervals of time. Over such intervals of time, e.g., every 30 seconds, the data collectors 12 send flow records to the aggregator 14. The flow records are sent from the collector to the aggregator over the network being monitored or over a hardened network (not shown). Preferably, the flow records are sent using a reliable protocol such as Mazu Profiler Control Protocol "MPCP" or other reliable protocols, e.g., those such as Transmission Control Protocol (TCP) or those built on TCP. MPCP is a layer built on top of TCP to handle flow records and other aggregator-sensor messages to insure either delivery of all flow records or indication of missing records.

There are a defined number of sources, a defined number of destinations, and a defined number of protocols on a given network. Over a defined interval (typically 30 seconds), the data collectors 12 monitor all connections between all pairs of hosts and destinations using any of the defined protocols. At the end of each interval, these statistics are summarized and reported to the aggregator 14. The values of the collected statistics are reset in the data collectors after reporting. The number of connections between ports using an unknown protocol are also monitored.

If more than one collector 12 saw the same source and destination communicating, the following could have occurred. The collectors 12 could be deployed in a way such that only one collector received the communication, or such that each received a portion of the communication due to a routing change. Alternatively, the data collectors could be deployed "in series," such that two or more data collectors 12 received the entire communication. Since route changes occur infrequently (at long intervals, relative to the length of a flow), the aggregator assumes that different collectors do not each receive a portion of the communication. The maximum of two received values is taken as a value for the connection and it is assumed that the lower value reflects dropped packets. The collectors 12 execute a mapping process 51a that is part of an ephemeral port detection process 50. The mapping process 51a is discussed in FIG. 4.

Figure 3:
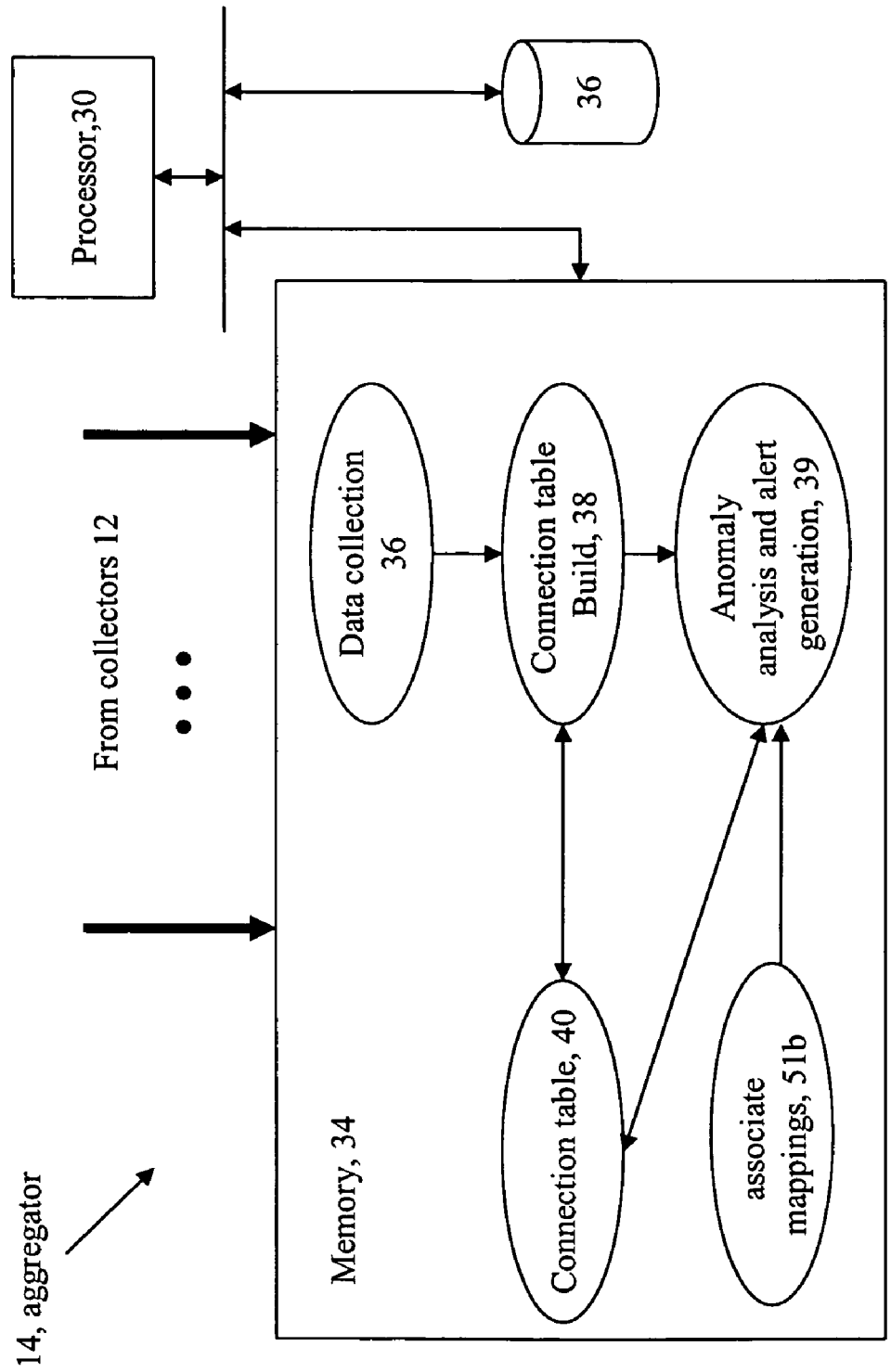
FIG. 3 is a block diagram depicting an aggregator.

Referring to FIG. 3, the aggregator 14 is a device (a general depiction of a general purpose computing device is shown) that includes a processor 30 and memory 32 and storage 34. Other implementations such as Application Specific Integrated Circuits are possible.

The aggregator 14 includes a process 36 to collect flow data from flow collectors 12 or probes 12a, a process 37 to store flow records, and a process 38 to produce a connection table 40 from the flow data or flow records. In addition, the aggregator includes anomaly analysis and event process 39 to detect anomalies and process anomalies into events that are reported to the operator console 16 or cause the system 10 to take action in the network 18. Anomalies in the connection table can be identified as events including denial of service attacks, unauthorized access attempts, scanning attacks, worm propagation, network failures, addition of new hosts, and so forth. Flow records are the main source of data for the connection table discussed below. From the flow records, long and short connection tables for heuristics and so forth are produced. Flow records are also recorded on disk (in flow logs) and used to compute aggregate statistics for reporting and to document network activity over time (for forensic purposes).

The aggregator 14 also includes a process 51b (FIG. 4) that associates the mappings received from collectors 12 corresponding to traffic on ephemeral ports, with an application to which the traffic belongs. For protocols that make connections over short-lived (ephemeral) ports, each connection dynamically negotiates port numbers, so that each connection or transaction might use a different, i.e., ephemeral, port number. Typically, ephemeral port numbers are negotiated over a control connection. For example, an FTP (File Transfer Protocol) client and server generally establishes an FTP control connection on a known port, e.g., "port 21" using the transmission control protocol (TCP), and then uses that connection to negotiate an ephemeral port for the actual bulk data transfers for an application.

Figure 4:
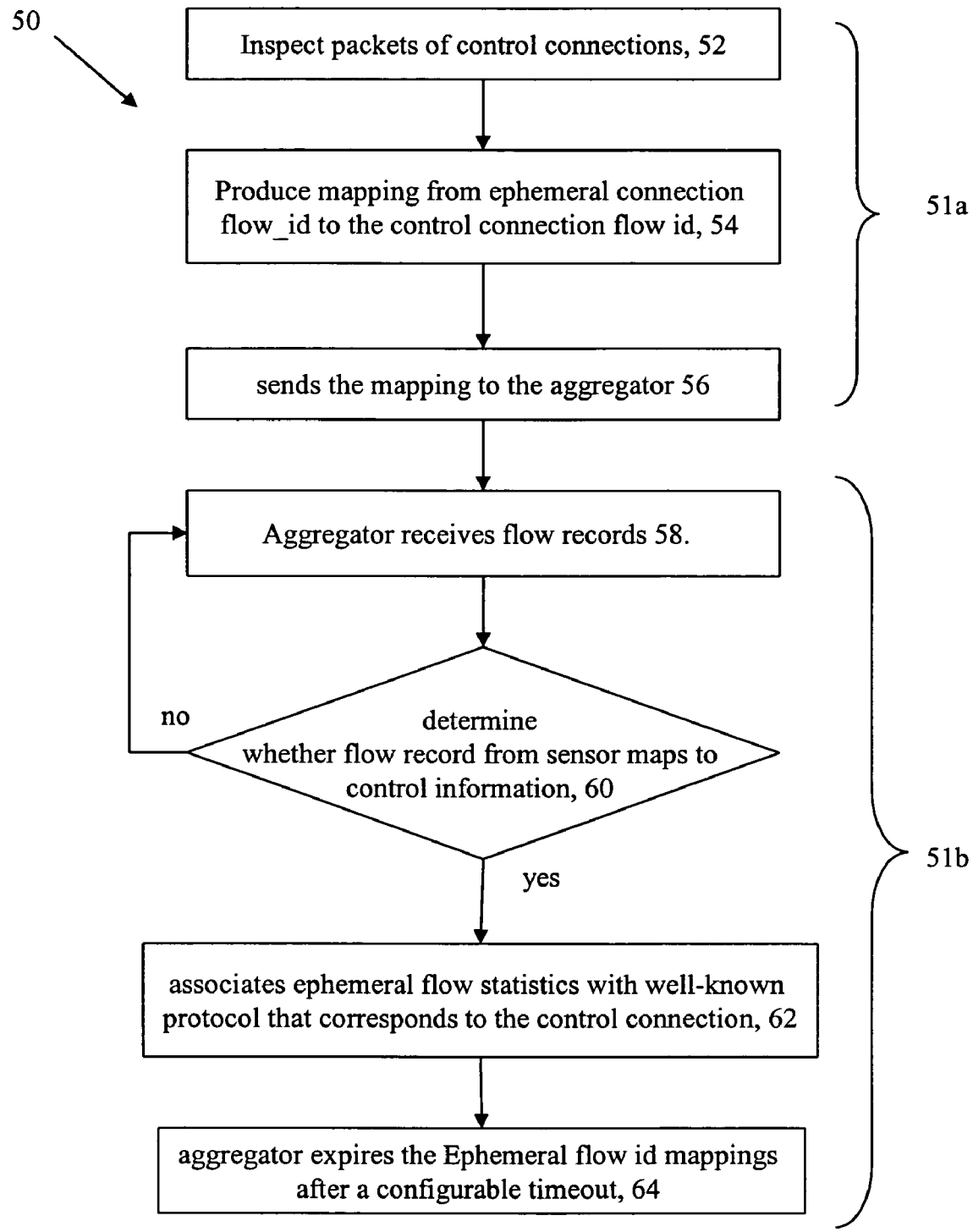
FIG. 4 is a flow chart of an ephemeral port tracking process.

Referring now to FIG. 4, the ephemeral tracking process 50 associates traffic on ephemeral ports with an application to which the traffic, e.g., data transfers, actually belong to is shown. Process 50 as described includes process 51a that produces mappings and typically runs on data collectors 12 and a process 51b that receives the mappings and is typically run on a central device such as the aggregator 14. Other arrangements are possible.

The ephemeral port tracking process 50 can track ports with applications as long as a control transaction that establishes the initial connection occurs on a well-known, unchanging port, and the control transaction is not encrypted (or if encrypted, can be decrypted). Ephemeral port detection is needed in applications concerning intrusion detection and in general for security applications because otherwise the traffic on ephemeral ports can cause false alerts. For example, traffic on an ephemeral port might appear to a scan attack detector algorithm as a scan attack. Other traffic could appear as a mysterious unknown application. Another application for ephemeral port detection might be as a traffic measurement or billing application where the application measures total FTP traffic not just FTP control traffic. The ephemeral port tracking process 50 is a generic process that includes implementation specifics that vary on a protocol-by-protocol basis.

An example of the port tracking process 50 will be described for the file transfer protocol (FTP). For one embodiment, the port tracking process includes the mapping process 51a that is run on collector devices, e.g., collectors 12, probes, sensors, etc and the process to associate the mappings 51b that is run on the central device, e.g., the aggregator 14 that is in communication with the collector devices.

The ephemeral port tracking process 50 for the file transfer protocol 50 inspects 52 all packets of control connections of interest. The ephemeral port tracking process 50 does not attempt to inspect other packets, such as packets with ephemeral ports, e.g., those actually involved in application bulk transfers and so forth. Typically, the inspection occurs on the collectors 12. For FTP, the process 50 examines all packets on "port 21/tcp." Packet inspection happens in the forwarding path in the kernel, running on a collector 12 using the Click system for packet analysis that runs in the kernel. Click was developed at MIT, and available under license. Other implementations are possible.

Inspecting 52 by the sensor 12, has the sensor examine connection packets looking for payload fragments that denote ephemeral port negotiation. For example, for the FTP protocol, the process 52 looks for 'PORT' and '227'FTP commands. When the process 50 detects an ephemeral port negotiation by the presence of these commands, the process 50 produces 54 a mapping from an expected ephemeral connection flow_id to the control connection flow id. The mapping comes from inspecting the packet. For example, on port 21 (FTP control), the server might use the PORT/227 commands to "use port 1234." The process 51a produces a mapping of port 1234 to port 21. For other protocols, the inspection would look for corresponding protocol specific commands.

Specifically, in the case of FTP, consider a control packet from SADDR:SPORT to DADDR:DPORT where this nomenclature corresponds to host:port. If the payload begins with

"PORT -?[0-9]+(,-?[0-9]+){5}"

the first four integers specify the client destination IP ("FADDR") and the last two specify the client destination port ("FPORT"). The process will produce a mapping as:
DADDR:[unknown port]:FADDR:FPORT→SADDR:SPORT:DADDR:DPORT If the payload begins with

"227.*-?[0-9]+(,-?[0-9]+){5}", the first four integers specify the server destination IP ("FADDR") and the last two specify the server destination port ("FPORT"), and the process produces the following mapping:
DADDR:[unknown port]:FADDR:FPORT→ADDR:DPORT:SADDR:SPORT In the nomenclature above "SADDR" refers to a source IP address (of the form X.Y.Z.W, e.g., 18.26.4.9). "SPORT" refers to source (TCP) port, a single integer and correspondingly "DADDR/DPORT" are the destination address/port. The nomenclature "-?[0-9]+(,-?[0-9]+){5}" is a regular expression that describes the format of a string. The expression means:

"-?": an optional '-'
"[0-9]+": followed by 1 or more digits
"(,-?[0-9]+){5}": followed by 5 instances of a string of the following form: a comma, and then an optional '-', and then 1 or more digits.

For example, the following string matches the above regular expression:

5,-10,97,4765,3,22

The 5 integers together specify the 4 parts of the IP address of the client or server (for example, an IP address like 18.26.4.9 can be expressed as the comma-separated sequence 18,26,4,9), and the client or server port number (which is just one integer).

The process sends 56 the mapping in a message that contains a series of ephemeral port mappings to the aggregator 14, e.g., using a reliable protocol to insure delivery of the messages or indication that the message was not received. One such protocol is the Mazu Profiler Control Protocol "MPCP." As discussed above, other reliable protocols can be used to transfer the messages.

The collectors 12 are flow probes that produce flow records. The aggregator 14 receives 58 the flow records from the flow probes and receives the mapping produced by the collector 12. The aggregator 14 determines whether a received flow record from a sensor 12 maps 60 to control information. The aggregator 14 determines whether the flow maps 60 to the control information by checking a flow id associated with the flow record to see whether the flow record maps to a control connection. If the flow id maps to a control connection, then the flow record corresponds to an ephemeral flow for a known control connection. The aggregator associates 62 the ephemeral flow statistics with those of the well-known protocol that corresponds to the control connection. The aggregator will expire 64 the Ephemeral flow id mappings after a configurable timeout.

Advantages of these techniques for tracking ephemeral ports include the efficiency at which ports are tracked. In particular, the collectors only need to examine relevant control connections, not all traffic in order to track ephemeral ports. Additionally, the aggregator can perform a type of application-specific analysis without the need to transfer actual packet payloads from the collector to the aggregator. All that is needed is the ephemeral flow id mapping.

A number of embodiments of the invention have been described. For instance, the mapping process 51a can be conducted on the aggregator 14 rather that the collectors 12. In addition, another type of device that has characteristic of a computing device can be used to track ephemeral ports rather than the aggregator. Nevertheless, it will be understood that various modifications may be made without departing from the spirit and scope of the invention.

What is claimed is:

1. A system, comprising:
   a plurality of collector devices that are disposed to collect information based on packets sent between nodes in a network, the collector devices including circuitry to:
   inspect packets of control connections to detect payload fragments that denote an ephemeral port negotiation; and
   produce a mapping from an ephemeral connection flow identifier to a control connection flow identifier,
      wherein the ephemeral connection flow identifier includes a destination address, an unknown port, a client destination address, and a client destination port, and
      wherein the control connection flow identifier includes a source address, source port, a destination address, and a destination port;
   an aggregator that receives the mapping data from the plurality of collector devices; and
   check a flow identifier associated with a flow record received by the aggregator to see whether the flow record maps to a control connection.

2. The system of claim 1 wherein if the flow identifier maps to a control connection, then the aggregator indicates that the flow record corresponds to an ephemeral flow for a known control connection.

3. The system of claim 2 wherein the aggregator associates ephemeral flow statistics with those of the well-known protocol that corresponds to the control connection.

4. The system of claim 1 wherein the aggregator expires the ephemeral flow identifier mappings after a configurable timeout.

5. The system of claim 1 wherein the aggregator performs an application-specific analysis without the need to transfer actual packet payloads from the collector to the aggregator.

6. The system of claim 1 wherein the collectors examine all packets on a specific port for a specific connection protocol.

7. The system of claim 6 wherein the protocol being tracked is the ftp and the connection port examined is port 21/tcp.

8. The system of claim 1 wherein payload fragments that denote ephemeral port negotiation for FTP are 'PORT' and '227' FTP commands.

9. The system of claim 1 wherein the collector sends the new mapping in a message to the aggregator.

10. A collector device disposed to collect statistical information on packets sent between nodes on a network, the collector device, comprising:
    a processor;
    a memory executing instructions to cause the collector device to:
    inspect packets of control connections to detect payload fragments that denote ephemeral port negotiation;
    produce a mapping from an ephemeral connection flow identifier to a control connection flow identifier,
       wherein the ephemeral connection flow identifier includes a destination address, an unknown port, a client destination address, and a client destination port, and
       wherein the control connection flow identifier includes a source address, source port, a destination address, and a destination port; and send the mapping to a device.

11. The device of claim 10 wherein the collector examines all packets on a specific port for a specific connection protocol.

12. The device of claim 11 wherein the protocol tracked is the ftp and the connection port examined is port 21/tcp.

13. The device of claim 12 wherein payload fragments that denote ephemeral port negotiation for FTP are 'PORT' and '227' FTP commands.

14. The device of claim 10 wherein the collector sends the new mapping in a message to the aggregator.

15. A device, comprising:
    a processor;
    a memory executing instructions to cause the device to:
    receive mappings of a ephemeral connection flow identifier to control connection flow identifier from a plurality of collector devices,
       wherein the ephemeral connection flow identifier includes a destination address, an unknown port, a client destination address, and a client destination port, and
       wherein the control connection flow identifier includes a source address, source port, a destination address, and a destination port; and
    check the flow identifier to see whether a received flow record maps to a control connection.

16. The device of claim 15 wherein the instructions to check further comprise instructions to determine if the flow identifier maps to a control connection, and if the flow identifier maps to a flow connection,
    produce an indication that the flow record corresponds to an ephemeral flow for a known control connection.

17. The device of claim 16 wherein the device associates ephemeral flow statistics with those of the well-known protocol that corresponds to the control connection.

18. The device of claim 15 further comprising instructions to:
    expire the ephemeral flow identifier mappings after a configurable timeout period.

19. A computer program product residing on a computer readable medium for tracking dynamically negotiated port numbers comprises instructions for causing a computer to:
    collect statistical information on packets that are sent between nodes on a network;
    inspect packets of control connections to detect payload fragments that denote ephemeral port negotiation;
    produce a mapping from a ephemeral connection flow identifier to a control connection flow identifier,
       wherein the ephemeral connection flow identifier includes a destination address, an unknown port, a client destination address, and a client destination port, and
       wherein the control connection flow identifier includes a source address, source port, a destination address, and a destination port; and
    check the flow identifier to see whether a flow record maps to a control connection.

20. The computer program product of claim 19 further comprising instructions to indicate that the flow record corresponds to an ephemeral flow for a known control connection.

21. The computer program product of claim 19 further comprising instructions to associate ephemeral flow statistics with those of a well-known protocol that corresponds to the control connection.

22. The computer program product of claim 19 further comprising instructions to expire the ephemeral flow identifier mappings after a configurable timeout.

23. The computer program product of claim 19 further comprising instructions to examine all packets on a specific port for a specific connection protocol.

24. A computer program product residing on a computer readable medium for determining mappings for ephemeral port connections comprising instructions to cause a computing device to:
 inspect packets of control connections to detect payload fragments that denote ephemeral port negotiation;
  produce a mapping from a ephemeral connection flow identifier to a control connection flow id,
   wherein the ephemeral connection flow identifier includes a destination address, an unknown port, a client destination address, and a client destination port, and
   wherein the control connection flow identifier includes a source address, source port, a destination address, and a destination port; and
 send the mapping to a device to associate the mapping with ephemeral connections.

25. The computer program product of claim 24 further comprising instructions to examines all packets on a specific port for a specific connection protocol.

26. The computer program product of claim 24 wherein the protocol tracked is the ftp and the connection port examined is port 21/tcp.

27. The computer program product of claim 24 wherein payload fragments that denote ephemeral port negotiation for FTP are 'PORT' and '227' FTP commands.

28. A computer program product residing on a computer readable medium for determining ephemeral port connections comprising instructions to cause a computing device to:
 receive, from a plurality of collector devices, mappings corresponding to a ephemeral connection flow identifier to a control connection flow identifier,
   wherein the ephemeral connection flow identifier includes a destination address, an unknown port, a client destination address, and a client destination port, and
  wherein the control connection flow identifier includes a source address, source port, a destination address, and a destination port; and
 check the flow identifier to see whether a received flow record maps to a control connection.

29. The computer program of claim 28 wherein the instructions to check further comprise instructions to determine if the flow identifier maps to a control connection; and if the flow identifier maps to a control connection,
 produce an indication that the flow record corresponds to an ephemeral flow for a known control connection.

30. The computer program product of claim 28 wherein the device associates ephemeral flow statistics with those of a well-known protocol that corresponds to the control connection.

31. A computer implemented method for tracking dynamically negotiated port connections, the method comprising:
 collecting statistical information on packets that are sent between nodes on a network;
 inspecting packets of control connections to detect payload fragments that denote ephemeral port negotiation;
 producing a mapping from a ephemeral connection flow identifier to a control connection flow identifier,
   wherein the ephemeral connection flow identifier includes a destination address, an unknown port, a client destination address, and a client destination port, and
   wherein the control connection flow identifier includes a source address, source port, a destination address, and a destination port; and
 checking the flow identifier to see whether a flow record maps to a control connection.

32. The method of claim 31 further comprising associating ephemeral flow statistics with those of a well-known protocol that corresponds to the control connection.

\* \* \* \* \*